United States Patent [19]
Takeuchi

[11] Patent Number: 4,752,716
[45] Date of Patent: Jun. 21, 1988

[54] BEAM-INDEX TYPE COLOR CATHODE RAY TUBE DEVICES

[75] Inventor: Kenichi Takeuchi, Tokyo, Japan

[73] Assignee: Sony Corporation, Tokyo, Japan

[21] Appl. No.: 914,713

[22] Filed: Oct. 2, 1986

[30] Foreign Application Priority Data

Oct. 3, 1985 [JP] Japan .................................. 60-220798
Oct. 17, 1985 [JP] Japan .................................. 60-231889

[51] Int. Cl.$^4$ ......................... H01J 29/32; H04N 9/24
[52] U.S. Cl. ................................. 313/471; 313/422; 313/466; 358/67; 358/68
[58] Field of Search .............. 313/471, 470, 399, 400, 313/478, 422; 358/64, 66, 67, 68, 69, 70

[56] References Cited

U.S. PATENT DOCUMENTS 4,635,106  1/1987  Shinkai ........................... 313/471 X
4,654,559  3/1987  Hinotani ......................... 313/471 X Primary Examiner—David K. Moore
Assistant Examiner—Mark R. Powell
Attorney, Agent, or Firm—Hill, Van Santen, Steadman & Simpson

[57] ABSTRACT

A beam-index type color cathode ray tube device which comprises a color cathode ray tube having a front panel portion and a screen panel portion provided with a phosphor screen shaped rectangularly to include a plurality of color phosphor stripes accompanied with index phosphor on its inner surface facing the front panel portion, a luminescence receiving plate member disposed at the outside of said screen panel portion of receiving fluorescence from the index phosphor and producing secondary fluorescence. The luminescence receiving plate member is shaped to have first and second cut-out side portions which are positioned to be close respectively to two corners of the phosphor screen each including a part of one of the top and bottom ends of the same so as to look toward a central part of the luminescence receiving plate member. A first fluorescence detector is attached to the first cut-out side portion for detecting the secondary fluorescence produced in the luminescence receiving plate member. A second fluorescence detector is attached to the second cut-out side portion for detecting the secondary fluorescence produced in the luminescence receiving plate member.

13 Claims, 5 Drawing Sheets

BEAM-INDEX TYPE COLOR CATHODE RAY TUBE DEVICES

BACKGROUND OF THE INVENTION

1. Field of the Invention

The present invention relates to beam-index type color cathode ray tube devices, and more particularly, to a color cathode ray tube device of the beam-index type in which a phosphor screen is provided with a plurality of color phosphor stripes accompanied with index phosphor on the inner surface of a screen panel portion facing a front panel portion and fluorescence from the index phosphor is detected by a photodetecting portion including a luminescence receiving plate member provided to face the outer surface of the screen panel portion.

2. Description of the Prior Art

There has been proposed a so-called reflex color cathode ray tube device of the beam-index type as one of the beam-index type color cathode ray tube devices which can be adapted generally to form color television receivers of relatively small size. The reflex color cathode ray tube device of the beam-index type comprises a flat color cathode ray tube having a front panel portion which allows colored light to pass therethrough and a screen panel portion which faces the front panel portion and is provided on the inner surface thereof with a phosphor screen including a plurality of color phosphor stripes of three primary colors and a plurality of index phosphor stripes, and a photodetecting portion disposed at the outside of the flat color cathode ray tube. The photodetecting portion includes a luminescence receiving plate member which is provided to face the outer surface of the screen panel portion of the flat color cathode ray tube for receiving fluorescence emitted from each of the index phosphor stripes and emitting secondary fluorescence in a wavelength range different from that of the fluorescence received and a fluorescence detector attached to the luminescence receiving plate member for detecting the secondary fluorescence emitted in the luminescence receiving plate member. With such a reflex color cathode ray tube device of the beam-index type, a color image displayed on the phosphor screen is observed through the front panel portion from the outside thereof and the fluorescence from each of the index phosphor stripes is detected substantially at the outside of the screen panel portion.

Figure 1:
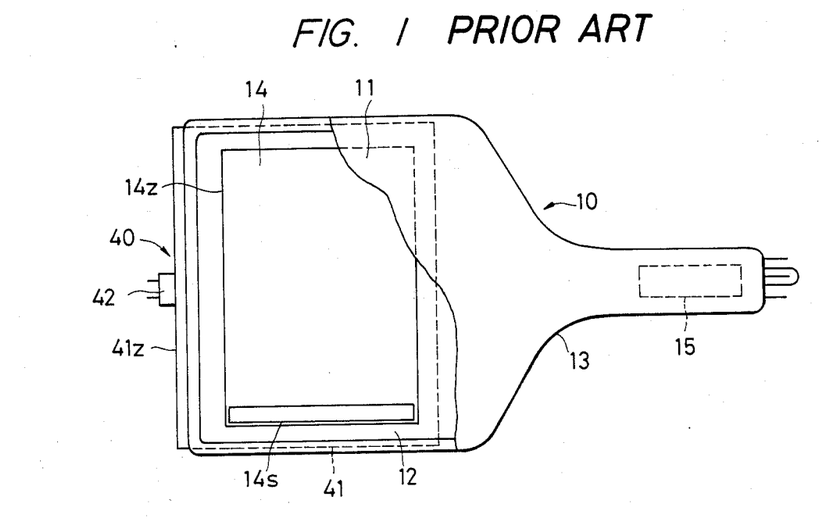
FIG. 1 is a schematic plan view, partially broken away, showing a reflex color cathode ray tube device of the beam-index type proposed previously.

FIG. 1 shows a previously proposed reflex color cathode ray tube device of the beam-index type. This device is composed mainly of a color cathode ray tube 10 and a photodetecting portion 40 disposed at the outside of the color cathode ray tube 10.

The color cathode ray tube 10 has a flat glass envelope which includes a front panel portion 11, a screen panel portion 12 facing the front panel portion 11, and a neck portion 13 connected to both the front panel portion 11 and the screen panel portion 12. The screen panel portion 12 is provided on its inner surface with a phosphor screen 14 of rectangular configuration. The phosphor screen 14 includes a plurality of color phosphor stripes of three primary colors, namely, green, red and blue phosphor stripes and a plurality of index phosphor stripes. In the neck portion 13, an electron gun assembly 15 is contained to produce an electron beam impinging on the phosphor screen 14 to scan the same. The front panel portion 11 permits colored light to pass therethrough and the screen panel portion 12 permits index fluorescence emitted from each of the index phosphor stripes with a peak level at a range of ultraviolet rays in its spectral characteristic to pass therethrough. At a partial area 14s of the phosphor screen 14 with which each horizontal beam scanning starts, color phosphor stripe is not provided but the index phosphor stripes are provided.

Figures 2, 3:
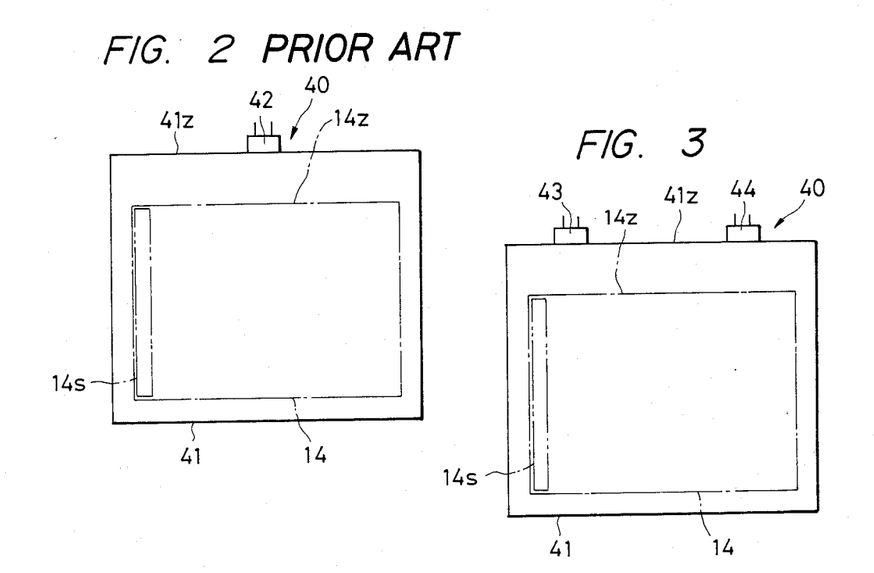
FIG. 2 is a schematic illustration showing a photodetecting portion of the reflex color cathode ray tube device of the beam-index type shown in FIG. 1.
FIG. 3 is a schematic illustration showing a photodetecting portion applicable to the reflex color cathode ray tube device of the beam-index type shown in FIG. 1.

The photodetecting portion 40 is composed of a luminescence receiving plate member 41 which is rectangular in shape and disposed to face the outer surface of the screen panel portion 12 and to extend along the phosphor screen 14, and an index fluorescence detector 42 which contains a photosensitive device such as a photodiode and is attached to a center of a side portion 41z of the luminescence receiving plate member 41 which extends in parallel with a top end 14z of the phosphor screen 14.

The luminescence receiving plate member 41 is formed of, for example, acrylic resins in which specific phosphors, which are excited by the index fluorescence from the index phosphor stripe and emit secondary index fluorescence in a wavelength range different from that of the index fluorescence received thereby and suitable for detection by the index fluorescence detector 42, are dispersed. This luminescence receiving plate member 41 is operative to receive the index fluorescence emitted by each of the index phosphor stripes to enter thereinto through the screen panel portion 12 and to produce the secondary index fluorescence in response to the index fluorescence received thereby.

In such a beam-index type color cathode ray tube device, when the phosphor screen 14 on the inner surface of the screen panel portion 12 is scanned by the electron beam generated by the electron gun assembly 15, the index fluorescence emitted by each of the index phosphor stripes enters into the luminescence receiving plate member 41 through the screen panel portion 12 and the secondary index fluorescence is produced in the luminescence receiving plate member 41 in respomse to the index fluorescence received thereby to be detected by the index fluorescence detector 42. Then, an index signal is obtained from the index fluorescence detector 42 to be used for causing the electron beam generated by the electron gun assembly 15 to be modulated in density with a color video signal supplied to the electron gun assembly 15 appropriately in response to momentary scanning positions of the electron beam on the phosphor screen 14. With such electron beam scanning, the green, red and blue phosphor stripes on the phosphor screen 14 emit green, red and blue fluorescences each having intensity determined in accordance with the density of the electron beams, respectively, and a color image formed by these green, red, and blue fluorescences is observed through the front panel portion 11 from the outside of the same.

Generally, a photosensitive device such as a photodiode has sensitivity to light which varies in response to changes in incidence angle of light entering thereinto in such a way that the larger the incidence angle the lower the sensitivity. Meanwhile, in the photodetecting portion 40 of the previously proposed reflex color cathode ray tube device of the beam-index type shown in FIG. 2, the luminescence receiving plate member 41 is shaped rectangularly in accordance with the phosphor screen 14 and the index fluorescence detector 42 is positioned at the center of the side portion 41z of the luminescence receiving plate member 41 extending in parallel with the top end 14z of the phosphor screen 14, and therefore the incident angle of the secondary index fluorescence to the index fluorescence detector 42 varies to a considerable degree in response to the shift of a location in the luminescence receiving plate member 41 from which the secondary index fluorescence is emitted. The result is that the index fluorescence detector 42 has sensitivity to the secondary index fluorescence which varies to a considerable degree in response to change in the location in the luminescence receiving plate member 41 from which the second index fluorescence is emitted. Especially, the secondary index fluorescence emitted from the corners of the luminescence receiving plate member 41 close to the side portion 41z of the same has a large incident angle to the index fluorescence detector 42, and accordingly the index fluorescence detector 42 has a low sensitivity to the secondary index fluorescence emitted from the corners of the luminescence receiving plate member 41 close to the side portion 41z of the same. In addition, at the corners of the phosphor screen 14, the electron beam scanning the phosphor screen 14 forms a relatively large landing spot and therefore each of the index phosphor stripes receives the electron beam with reduced intensity. This results in the index fluorescence enitted by the index phosphor stripe disposed at the corners of the phosphor screen 14 being reduced in intensity and consequently the secondary index fluorescence emitted in the corners of the luminescence receiving plate member 41 also being reduced in intensity.

Accordingly, in the previously proposed reflex color cathode ray tube devices of the beam-index type, the index signal obtained from the index fluorescence detector 42 varies in level to a considerable degree in response to the location on the phosphor screen 14 at which the index fluorescence is emitted by the index phosphor stripe. Especially, when the index fluorescence is emitted from the corner of the phosphor screen 14 close to the top end 14z, the level of the index signal is lowered considerably, and it is feared that, under the control with the index signal having an insufficient level, the electron beam for scanning the phosphor screen 14 is not modulated in density with the color video signal supplied to the electron gun assembly 15 appropriately and stably in response to the momentary scanning positions of the electron beam on the phosphor screen 14. Further, in the case of the electron beam for exciting each of the index phosphor stripes being increased in density in order to raise the intensity of the index fluorescence entering into the luminescence receiving plate member 41, a dark electron beam current in the cathode ray tube 10 is increased and therefore a black level of a color image on the phosphor screen 14 rises so as to deteriorate quality of the color image.

Then, for the purpose of avoiding the above mentioned problems or disadvantages that occur in the previously proposed reflex color cathode ray tube device of the beam-index type shown in FIGS. 1 and 2, it is considered, as shown in FIG. 3, to provide a pair of index fluorescence detectors 43 and 44 at right and left sections of the side portion 41z of the luminescence receiving plate member 41, respectively, and to synthesize both output signals obtained from the index fluorescence detectors 43 and 44 so as to produce an index signal. In the reflex color cathode ray tube device of the beam-index type provided with such index fluorescence detectors 43 and 44, secondary index fluorescence which is emitted from a location in the luminescence receiving plate member 41 corresponding to the upper left corner of the phosphor screen 14 at which the index fluorescence is emitted has a reduced incident angle to the index fluorescence detector 43. Similarly, secondary index fluorescence which is emitted from a location in the luminescence receiving plate member 41 corresponding to the upper right corner of the phosphor scree 14 at which the index fluorescence is emitted has also a reduced incident angle to the index fluorescence detector 44, compared with the incident angle to the index fluorescence detector 42 of the secondary index fluorescence emitted from a location in the luminescence receiving plate member 41 corresponding to one of upper left and right corners of the phosphor screen 14 at which the index fluorescence is emitted in the previously proposed device shown in FIGS. 1 and 2. Variations in incident angle to each of the index fluorescence detectors 43 and 44 of the secondary index fluorescence, which are caused in response to the shift of a location in the luminescence receiving plate member 41 from which the secondary index fluorescence is emitted, are reduced, compared with the variations in incident angle to the index fluorescence detector 42 of the seondary index fluorescence in the previously proposed device shown in FIGS. 1 and 2. Consequently, variations in level of the index signal obtained by synthesizing the detection output signals from the index fluorescence detectors 43 and 44, which are caused in response to the shift of a location on the phosphor screen 14 at which the index fluorescence is emitted, are also reduced, compared with those in the previously proposed device shown in FIGS. 1 and 2.

However, even though the photodetecting portion 40 is composed of the luminescence receiving plate member 41 and the index fluorescence detectors 43 and 44 are positioned in a manner as shown in FIG. 3, the secondary index fluorescence emitted from the locations in the luminescence receiving plate member 41 corresponding to the upper left and right corners of the phosphor screen 14, at which the electron beam scanning the phosphor screen 14 forms a relatively large landing spot and therefore each of the index phosphor stripes emits the index fluorescence with reduced intensity, still does not have a sufficiently reduced incident angle to the index fluorescence detector 43 or 44, and the variations of the incident angle to the index fluorescence detector 43 or 44 of the secondary index fluorescence, which are caused in response to the shift of the location in the luminescence receiving plate member 41 from which the secondary index fluorescence is emitted, are not reduced enough. Accordingly, the variations in level of the index signal obtained by synthesizing the detection output signals from the index fluorescence detectors 43 and 44, which are caused in response to the shift of the location on the phosphor screen 14 at which the index fluorescence is emitted, are not reduced enough, and therefore the problems and/or disadvantages occurring in the previously proposed device shown in FIGS. 1 and 2 cannot be surely eliminated.

OBJECTS AND SUMMARY OF THE INVENTION

Accordingly, it is an object of the present invention to provide a beam-index type color cathode ray tube device which avoids the foregoing problems and disadvantages encountered with the prior art.

Another object of the present invention is to provide a beam-index type color cathode ray tube device which has a color cathode ray tube provided with a phosphor screen formed to include a plurality of color phosphor stripes accompanied with index phosphor on the inner surface of a screen panel portion facing a front panel portion, so that a color image displayed on the phosphor screen is observed through the front panel portion, and a photodetecting portion including a luminescence receiving plate member provided to face the outer surface of the screen panel portion for receiving index fluorescence from the index phosphor to emit secondary fluorescence and a fluorescence detector provided for detecting the secondary fluorescence to generate an index signal, and in which the index signal is obtained with a relatively high level and with reduced variations thereof in response to the index fluorescence regardless of a location on the phosphor screen of the index phosphor stripe actually emitting the index fluorescence.

A further object of the present invention is to provide a beam-index type color cathode ray tube device which has a color cathode ray tube provided with a phosphor screen formed to include a plurality of color phosphor stripes accompanied with index phosphor on the inner surface of a screen panel portion facing a front panel portion, so that a color image displayed on the phosphor screen is observed through the front panel portion, and a photodetecting portion including a luminescence receiving plate member provided to face the outer surface of the screen panel portion for receiving index fluorescence from the index phosphor to emit secondary fluorescence and a fluorescence detector provided for detecting the secondary fluorescence to generate an index signal, and in which a control operation for causing an electron beam scanning the phosphor screen in the color cathode ray tube to be modulated in density with a color video signal appropriately in response to momentary scanning positions of the electron beam on the phosphor screen, is carried out stably on the strength of the index signal.

A still further object of the present invention is to provide a beam-index type color cathode ray tube device which has a color cathode ray tube provided with a phosphor screen formed to include a plurality of color phosphor stripes accompanied with index phosphor on the inner surface of a screen panel portion facing a front panel portion, so that a color image displayed on the phosphor screen is observed through the front panel portion, and a photodetecting portion including a luminescence receiving plate member is provided to face the outer surface of the screen panel portion for receiving index fluorescence from the index phosphor to emit secondary index fluorescence, and a fluorescence detector is provided for detecting the secondary fluorescence to generate an index signal, and in which the luminescence receiving plate member is precisely supported at a proper position relative to the phosphor screen and the secondary index fluorescence emmitted in the luminescence receiving plate member is detected efficiently by the fluorescence detector.

According to the present invention, there is provided a beam-index type color cathode ray tube device which comprises a color cathode ray tube having a front panel portion permitting colored light to pass therethrough and a screen panel portion provided with a phosphor screen formed in the shape of a rectangle to include a plurality of color phosphor stripes of multiple colors accompanied with index phosphor on the inner surface thereof facing the front panel portion, a luminescence receiving plate member disposed to face the outer surface of the screen panel portion for rec iving index fluorescence from the index phosphor and emitting secondary index fluorescence in response to the index fluorescence received thereby and shaped to have first and second angled, or cut-out side portions which are positioned to be close to two corners of the phosphor screen each including a part of one of the top and bottom ends of the same, respectively, so as to look toward a central part of the luminescence receiving plate member, a first fluorescence detector for detecting the secondary index fluorescence emitted by the luminescence receiving plate member, which is attached to the first cut-out side portion of the luminescence receiving plate member to be located in the vicinity of a position on an extension of a left sideline of the phosphor screen, and a second fluorescence detector for detecting the secondary index fluorescence emitted by the luminescence receiving plate member, which is attached to the second cut-out side portion of the luminescence receiving plate member to be located in the vicinity of a position on an extension of a right sideline of the phosphor screen.

In the device thus constituted in accordance with the present invention, when the phosphor screen is scanned by an electron beam generated in the color cathode ray tube, the color phosphor stripes emit respective colored fluorescences and the index phosphor emits the index fluorescence. The index fluorescence emitted by the index phosphor enters through the screen panel portion into the luminescence receiving plate member to be received by the same. The luminescence receiving plate member emits the secondary index fluorescence which is suitable in wavelength for detection by first and second fluorescence detectors in response to the index fluorescence emitted by the index phosphor and received thereby. Then, the secondary index fluorescence emitted in the luminescence receiving plate member is guided through the luminescence receiving plate member to the first and second fluorescence detectors to be detected thereby, so that an index signal can be produced by synthesizing both output signals obtained from the first and second fluorescence detectors in respons to the secondary index fluorescence detectors detected thereby.

With the first and second fluorescence detectors attached respectively to the first and second cut-out side portions of the luminescence receiving plate member so as to look against the central part of the luminescence receiving plate member, even the secondary index fluorescence emitted from locations in the luminescence receiving plate member corresponding to the corners of the phosphor screen at which the electron beam scanning the phosphor screen forms a relatively large landing spot and therefore the index phosphor emits the index fluorescence with reduced intensity, has a sufficiently reduced incident angle to the first or second fluorescence detector, and variations of the incident angle to the first or second fluorescence detector of the secondary index fluorescence which are caused in response to the shift of a location in the luminescence receiving plate member from which the secondary index fluorescence is emitted, sufficiently reduced. Consequently, the minimum level of the index signal is sufficiently increased, and variations in level of the index signal produced by synthesizing the output signals obtained from the first and second fluorescence detectors, which are caused in response to the shift of a location on the phosphor screen at which the index fluorescence is emitted, are reduced enough. As a result, a control operation for causing the electron beam scanning the phosphor screen in the color cathode ray tube to be modulated in density with a color video signal appropriately in response to momentary scanning positions of the electron beam on the phosphor screen is carried out stably on the strength of the index signal.

Further, since the minimum level of the index signal is sufficiently increased and therefore the electron beam for exciting the index phosphor in the color cathode ray tube can be decreased in density, a dark electron current in the color cathode ray tube may be decreased to lower a black level of color images on the phosphor screen and thereby to improve color purity and contrast characteristic of the color images.

In an embodiment of device according to the present invention taken by way of example, the fluorescence receiving plate member is supported by a holder which comprises a frame member engaging with a peripheral portion of the fluorescence receiving plate member to surround the side portions of the same with the exception of parts to which the first and second fluorescence detectors are attached and is fixed to the outer surface of the screen panel portion of the color cathode ray tube. The frame member is provided with a reflecting layer on at least a part of the inner surface thereof facing the side portions of the fluorescence receiving plate member.

With use of such a holder, the fluorescence receiving plate member is easily mounted on the outer surface of the screen panel portion to be disposed precisely at a proper position relative to the phosphor screen, and the secondary fluorescence emitted in the luminescence receiving plate member is partially reflected at the side portions of the luminescence receiving plate member toward the inside of the same and guided efficiently to the first and second fluorescence detectors to be detected thereby.

The above, and other objects, features and advantages of the present invention will become apparent from the following detailed description which is to be read in conjunction with the accompanying drawings.

DESCRIPTION OF THE PREFERRED EMBODIMENTS

Figure 4:
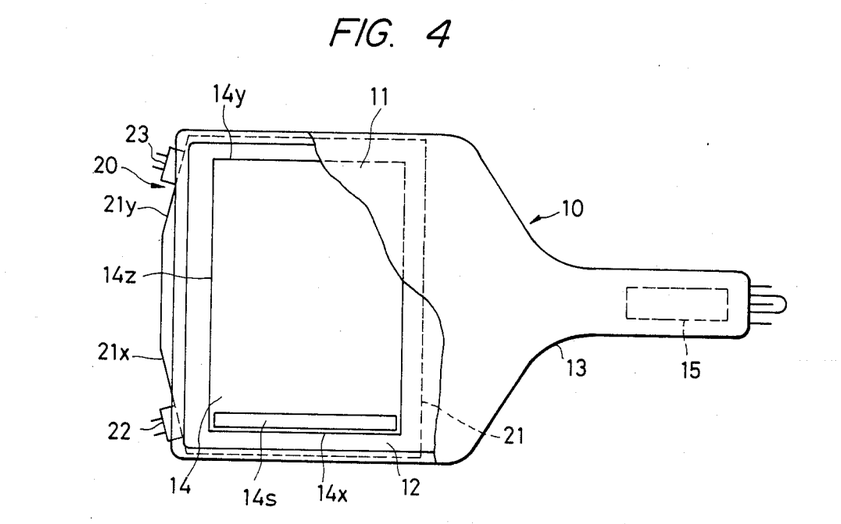
FIG. 4 is a schematic plan view, partially broken away, showing one embodiment of beam-index type color cathode ray tube device according to the present invention.
Figure 5:
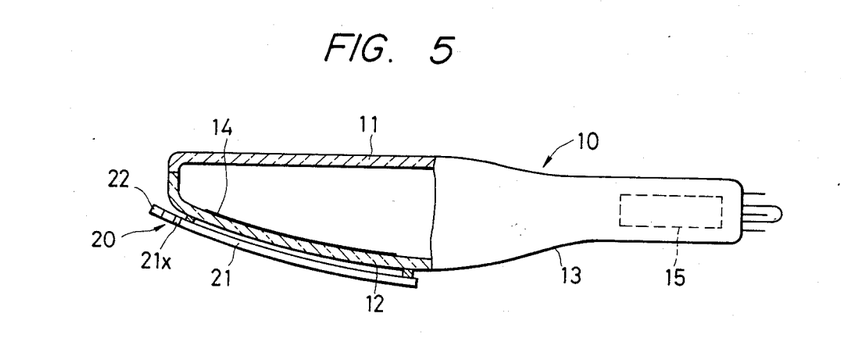
FIG. 5 is a schematic side view, partly in cross section, of the embodiment shown in FIG. 4.

FIGS. 4 and 5 show an example of the beam-index type color cathode ray tube device according to the present invention. This example comprises mainly a color cathode ray tube 10 and a photodetecting portion 20 disposed at the outside of the color cathode ray tube 10.

The color cathode ray tube 10 has a flat glass envelope which includes a front panel portion 11, a screen panel portion 12 facing the front panel portion 11, and a neck portion 13 connected to both the front panel portion 11 and the screen panel portion 12. The front panel portion 11 is rectangular in shape and permits colored light to pass therethrough. The screen panel portion 12 is also shaped rectangularly in accordance with the front panel portion 11 and is curved slightly, and permits index fluorescence, which will be described later, to pass therethrough. Further, the screen panel portion 12 is provided on its inner surface with a phosphor screen 14 extending to be rectangular along the screen panel portion 12. In the neck portion 13, an electron gun assembly 15 is contained to produce an electron beam impinging on the phosphor screen 14 from the side of the front panel portion 11 to scan the same. Since the phosphor screen 14 is curved along the screen panel portion 12, the incident angle of the electron beam with the screen 14 is prevented from having large variations at different locations over the phosphor screen 14.

The phosphor screen 14 includes a plurality of color phosphor stripes of three primary colors and an index phosphor. The index phosphor is not necessarily shaped into a plurality of stripes. For example, in an embodiment of the phosphor screen 14 shown in FIG. 6, a plurality of light absorbing stripes 31 made of carbon, aluminium oxide or the like are secured on the inner surface of the screen panel portion 12 to extend parallel to one another at regularly spaced intervals, and an index phosphor layer 32 is provided to cover the light absorbing stripes 31 and portions of the inner surface of the screen panel portion 12 each striped between each adjoining pair of light absorbing stripes 31. Further, a metallic reflecting layer 33 which is formed, for example, by means of vacuum evaporation of aluminium is put on the index phosphor layer 32, and a plurality of color phosphor stripes of the three primary colors containing green phosphor stripes G, red phosphor stripes R and blue phosphor stripes B are provided on the metallic reflecting layer 33 in a predetermined arrangement. At the partial area 14s of the phosphor screen 14 with which each horizontal beam scanning starts, no color phosphor stripe is provided on the metallic reflecting layer 33. The index phosphor layer 32 emits index fluorescence with a peak at a range of ultraviolet rays in its spectral characteristic in response to impingement of an electron beam thereon, and the green, red and blue phosphor stripes G, R and B produce green fluorescence red fluorescence, and blue fluorescence by excitation by an electron beam, respectively.

Figure 7:
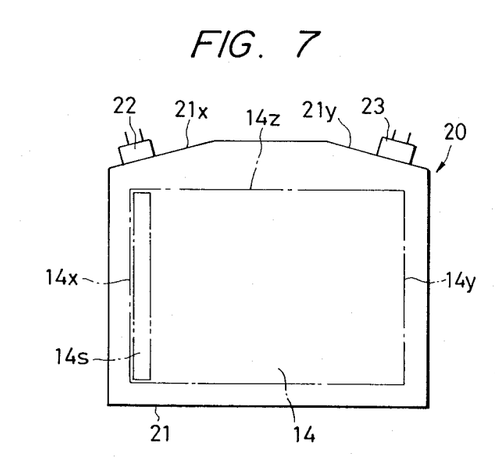
FIG. 7 is a schematic illustration showing a photodetecting portion of the embodiment shown in FIGS. 4 and 5.

At the outside of the screen panel portion 12, a luminescence receiving plate member 21 is disposed to face and extend along the outer surface of the screen panel portion 12. As shown in FIG. 7, the luminescence receiving plate member 21 is generally rectangular in shape and has first and second cut-out, or angled, side portions 21x and 21y which are positioned to be close to two corners of the phosphor screen 14 each including a part of a top end 14z of the same, respectively, so as to look toward a central part of the luminescence receiving plate member 21. Then, a first index fluorescence detector 22 containing a photosensitive device such as a photodiode is attached to the first cut-out side portion 21x of the luminescence receiving plate member 21 to be located in the vicinity of a position on an extension of a left sideline 14x of the phosphor screen 14 and a second index fluorescence detector 23 also containing a photosensitive device such as a photodiode is attached to the second cut-out side portion 21y of the luminescence receiving plate member 21 to be located in the vicinity of a position on an extension of a right sideline 14y of the phosphor screen 14.

The luminescence receiving plate member 21 may be formed, for example, of plastic, such as acrylic resins, in which specific phosphors are disposed and which are excited by the index fluorescence emitted from the index phosphor layer 32 and emit secondary index fluorescence in a wavelength range different from that of the index fluorescence and suitable for detection by the photosensitive devices contained in the first and second index fluorescence detectors 22 and 23. This luminescence receiving plate member 21 receives the index fluorescence emitted from the index phosphor layer 32 through the screen panel portion 12 and produces the secondary index fluorescence in response to the index fluorescence received thereby.

The first and second index fluorescence detectors 22 and 23 are operative to detect the secondary index fluorescence emitted in the luminescence receiving plate member 21 and to generate first and second output signals in response to the secondary index fluorescence received, respectively. Then, an index signal is produced by synthesizing the first and second output signals from the first and second index fluorescence detectors 22 and 23.

One surface opposite to a surface facing to the screen panel portion 12 and side portions of the luminescence receiving plate member 21 may be covered by a thin metallic reflecting layer formed, for example, by means of vacuum evaportion of aluminium with the exception of a part of the first angled, or cut-out, side portion 21x to which the first index fluorescence detector 22 is attached and a part of the second cut-out portion 21y to which the second index fluorescense detector 23 is attached. The luminescence receiving plate member 21 may be stuck to the outer surface of the screen panel portion 12 with an adhesive tape or the like at its outer peripheral portion, and the first and second index fluorescence detectors 22 and 23 attached respectively to the first and second cut-out side portions 21x and 21y of the luminescence receiving plate member 21 with transparent adhesive agent.

Figure 6:
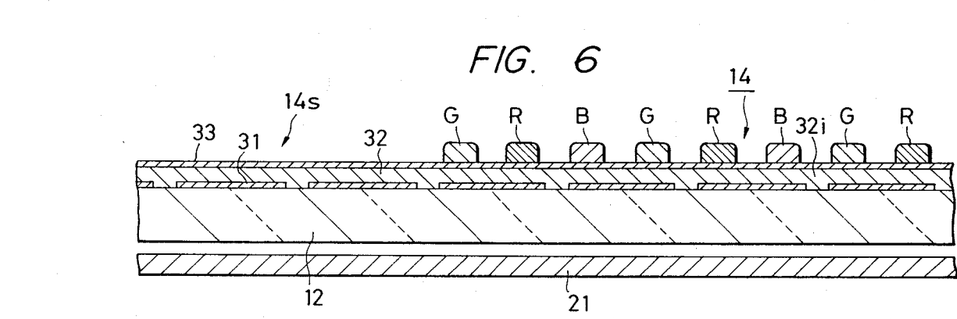
FIG. 6 is a partial cross-sectional view of a phosphor screen employed in the embodiment shown in FIGS. 4 and 5.

In such an embodiment of the present invention, when the phosphor screen 14 is scanned by the electron beam generated by the electron gun assembly 15 in the color cathode ray tube 10, the index phosphor layer 32 is excited by the electron beam which impinges on the index phosphor layer 32 through the metallic reflecting layer 33 and emits the index fluorescence. The index fluorescence emitted by portions of the index phosphor layer 32 provided on the light absorbing stripes 31 is intercepted by the light absorbing stripes 31, and the index fluorescence emitted by other portions 32i of the index phosphor layer 32 located on the inner surface of the screen panel position 12 between adjoining light absorbing stripes stripes 31, enters through the screen panel portion 12 into the luminescence receiving plate member 21. The luminescence receiving plate member 21 produces the secondary index fluorescence at a location therein where the index fluorescence from the portions 32i of the index phosphor layer 32 enters thereinto. Then, the secondary index fluorescence is detected by the first and second index fluorescence detectors 22 and 23, and the index signal is produced by synthesizing the first and second output signals from the first and second index fluorescence detectors 22 and 23.

The index signal thus obtained is used for causing the electron beam generated by the electron gun assembly 15 for scanning the phosphor screen 14 to be modulated in density with a color video signal including green, red and blue video signals supplied to the electron gun assembly 15 appropriately in response to momentary scanning positions of the electron beam on the phosphor screen 14. With such an electon beam as moduluated in density in response to the index signal, the green, red and blue phosphor stripes G, R and B on the phosphor screens 14 emit the green, red and blue fluorescences each having intensity determined in accordance with the density of the electron beams, respectively, and a color image is displayed by these green, red and blue fluorescences on the phosphor screen 14 to be observed through the front panel portion 11 from the outside of the same.

In this case, the secondary index fluorescence which is emitted from a location in the luminescence receiving plate member 21 corresponding to the upper left corner of the phosphor scree 14 at which the index fluorescence is emitted has a sufficiently reduced incident angle to the first index fluorescence detector 22 and the secondary index fluorescence which is emitted from a location in the luminescence receiving plate member 21 corresponding to the upper right corner of the phosphor screen 14 at which the index fluorescence is emitted from a location in the luminescence receiving plate member 21 corresponding to the upper right corner of the phosphor screen 14 at which the index fluorescence is emitted has also a sufficiently reduced incident angle to the second index fluorescence detector 23, compared with the incident angle to the index fluorescence detector 42 of the secondary index fluorescence emitted from a location in the luminescence receiving plate member 41 corresponding to one of upper left and right corners of the phosphor screen 14 at which the index fluorescence is emitted in the previously proposed device shown in FIGS. 1 and 2. Therefore, variations in incident angle to each of the first and second index fluorescence detectors 22 and 23 of the secondary index fluorescence, which are caused in response to the shift of the location in the luminescence receiving plate member 21 from which the secondary index fluorescence is emitted, are sufficiently reduced, compared with the previously proposed device shown in FIGS. 1 and 2. Consequently, variations in level of the index signal obtained by synthesizing the output signals obtained from the first and second index fluorescence detectors 22 and 23, which are caused in response to the shift of the location on the phosphor screen 14 at which the index fluorescence is emitted, are also sufficiently reduced, compared with those in the previously proposed device shown in FIGS. 1 and 2.

In this connection, the measurement of a level of the index signal was conducted under the condition in which a color cathode ray tube of four inches in screen size was adopted as a sample tube corresponding to the color cathode ray tube 10 and photodetecting portions 20 corresponding to the photodetecting portions 40 shown in FIGS. 2 and 3 and the photodetecting portions 20 shown in FIG. 7, respctively, were attached selectively to the sample tube, and the following results were obtained.

In the case of the photodetecting portion corresponding to the photodetecting portion 40 shown in FIG. 2 being attached to the sample tube, an index signal had a ratio of the maximum level to the minimum level of 100/7; in the case of the photodetecting portion corresponding to the photodetecting portion 40 shown in FIG. 3 being attached to the sample tube, an index signal had a ratio of the maximum level to the minimum level of 92/40; and in the case of the photodetecting portion corresponding to the photodetecting portion 20 shown in FIG. 7 being attached to the sample tube, an index signal had a ratio of the maximum level to the minimum level of 86/78.

As understood from these results, in the beam-index type color cathode ray tube device of the invention, the index signal is obtained with a relatively high level and reduced variation in response to the index fluorescence emitted from various locations over the phosphor screen 14, and therefore the control operation for causing the electron beam scanning the phosphor screen 14 in the color cathode ray tube to be modulated in density with the color video signal appropriately in response to the momentary scanning positions of the electron beam on the phosphor screen 14, is carried out stably on the strength of the index signal. Further, since the minimum level of the index signal is sufficiently increased and accordingly the electron beam for exciting the index phosphor layer 32 in the color cathode ray tube 10 can be decreased in density, a dark electron current in the color cathode ray tube 10 may be decreased to lower a black level of the color image on the phosphor screen 14 and thereby to improve color purity and contrast characteristic of the color image.

Figure 8:
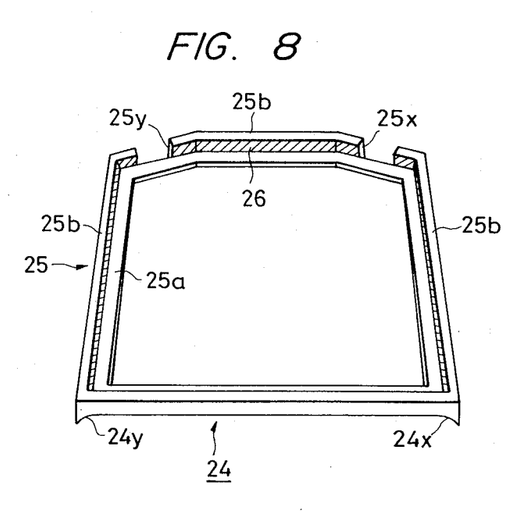
FIG. 8 is a schematic perspective view showing an example of a holder applicable for supporting the photodetecting portion of the embodiment shown in FIGS. 4 and 5.

In a modification of the embodiment, the photodetecting portion 20 including the luminescence receiving plate member 21, which is not provided with any metallic layer on its side portions, may be supported by a holder 24 as shown in FIG. 8 to cause the luminescence receiving plate member 21 to face the outer surface of the screen panel portion 12 of the color cathode ray tube 10. The holder 24 of FIG. 8 comprises a frame member 25 formed, for example, of plastics such as acrylonitrile-butadien-styrene copolymer to have a base portion 25a for coming in contact with the oute peripheral portion of the luminescence receiving plate member 21 and a side wall portion 25b for surrounding the side portions of the luminescence receiving plate member 21, and a metallic reflecting layer 26 provided on the inner surface of the side wall portion 25b which faces the side portions of the luminescence receiving plate member 21. The side wall portion 25b of the frame member 25 is provided with openings 25x and 25y in which the first and second index fluorescence detectors 22 and 23 are inserted. Further, at opposite ends of the base portion 25a which extend along the left and right sidelines 14x and 14y of the phosphor screen 14 respectively and face the outer surface of the screen panel portion 12, curved projections 24x and 24y are provided to fit to the curved edges of the screen panel portion 12, respectively. The metallic layer 26 is formed, for example, by means of vacuum evaporation of aluminium or plating of chromium.

Figure 9:
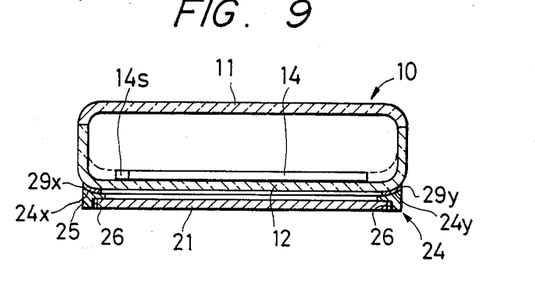
FIG. 9 is a schematic cross-sectional view showing another embodiment of beam-index type color cathode ray tube device according to the present invention.
Figure 10:
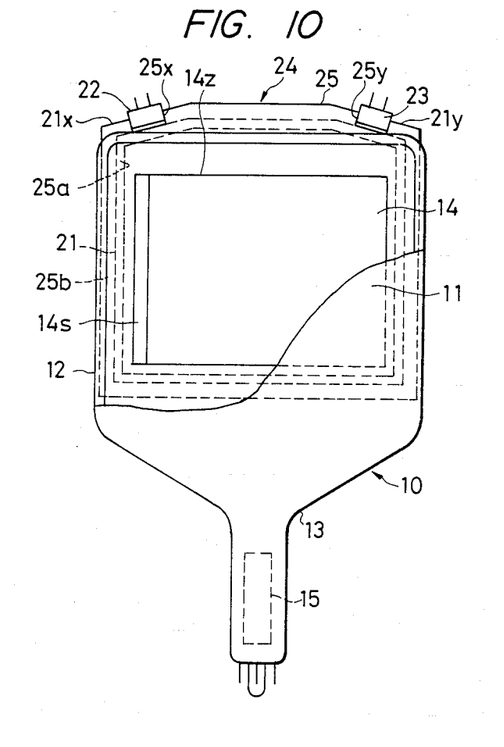
FIG. 10 is a schematic plan view, partially broken away, of the embodiment shown in FIG. 9.
Figure 11:
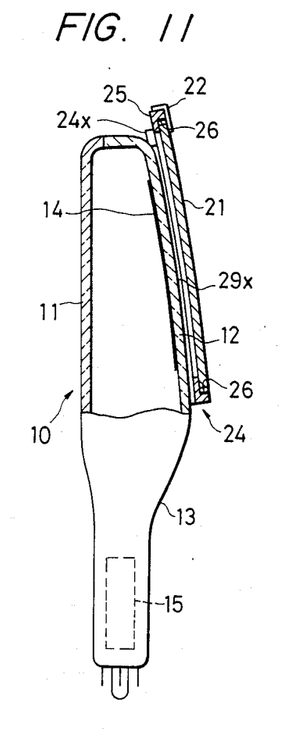
FIG. 11 is a schematic side view, partly in cross section, of the embodiment shown in FIG. 9.

FIGS. 9, 10 and 11 show another embodiment of beam-index color cathode tube device according to the present invention, in which the holder 24 is employed for supporting the photodetecting portion 20. In this embodiment, the holder 24 is attached to the screen panel portion 12 of the color cathode ray tube 10 with an adhesive tape 29x put between the curved projection 24x and the outer surface of the screen panel portion 12 and an adhesive tape 29y put between the curved projection 24y and the outer surface of the screen panel portion 12. The luminescence receiving plate member 21 without any metallic layer on its side portions and the first and second index fluorescence detectors 22 and 23 both attached respectively to the first and second cut-out side portions 21x and 21y of the luminescence receiving plate member 21, are mounted to the holder 24 in such a manner that the outer peripheral portion of the luminescence receiving plate member 21 is engaged with the base portion 25a to be adhered to the same, the said portions of the luminescence receiving plate member 21 are surrounded by the metallic reflecting layer 26 provided on the inner surface of the side wall portion 25b, and the first and second fluorescence detectors 22 and 23 are placed in the openings 25x and 25y.

Figure 12:
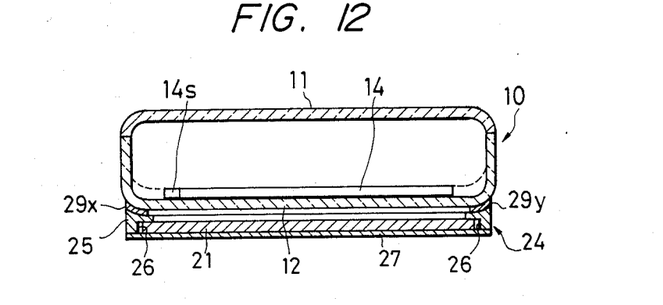
FIG. 12 is a schematic cross-sectional view showing a further embodiment of beam-index tupe color cathode ray tube device according to the present invention.

FIG. 12 shows a further embodiment of beam-index color cathode ray tube device according to the present invention, in which the holder 24 is also employed for supporting the photodetecting portion 20. In the embodiment of FIG. 12, the holder 24 includes a back board member 27 in addition to the frame member 25 and the metallic reflecting layer 26. The back board member 27 is stuck with adhesive agent to the frame member 25 to which the luminescence receiving plate member 21 is engaged, so as to support one of the surfaces of the luminescence receiving plate member 21, which is opposite to the other of the surfaces facing to the screen panel portion 12.

Figure 13:
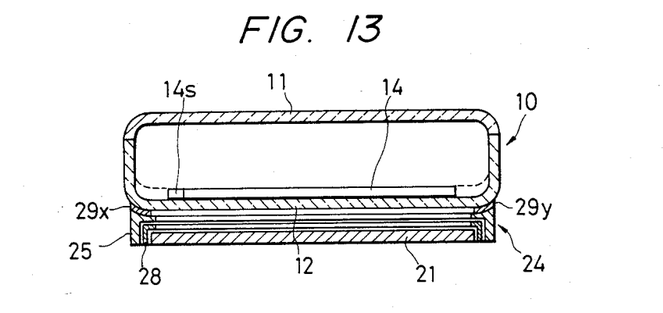
FIG. 13 is a schematic cross-sectional view showing a still further embodiment of beam-index type color cathode ray tube device according to the present invention.
Figure 14:
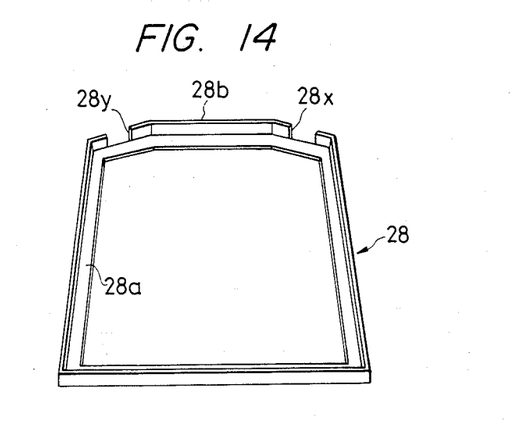
FIG. 14 is a schematic perspective view showing a part of a holder employed for supporting a photodetecting portion of the embodiment shown in FIG. 13.

FIG. 13 shows a still further embodiment of beam-index color cathode ray tube device according to the present invention which also employs the holder 24 for supporting the photodetecting portion 20. In the embodiment shown in FIG. 13, the holder 24 comprises the frame member 25 which is not provided with any metallic reflecting layer on the inner surface of the wall portion thereof and a metallic reflecting plate member 28 placed at the inside of the frame member 25 to be adhered to the same. As shown in FIG. 14, the metallic reflecting plate member 28 is made, for example, of aluminium foil or the like to have a base portion 28a formed in the shape of a frame for coming in contact with the outer peripheral portion of the luminescence receiving plate member 21 and a side wall portion 28b for surrounding the side portions of the luminescence receiving plate member 21. The side wall portion 28b of the metallic reflecting plate member 28 is provided with a pair of openings 28x and 28y at locations corresponding to the openings 25x and 25y of the frame member 25, respectively, so that the first and second index fluorescence detectors 22 and 23 are placed in the openings 28x and 28y, respectively.

The luminescence receiving plate member 21 without any metallic layer on its side portions is mounted to the metallic reflecting plate member 28 placed at the inside of the frame member 25 in such a manner that the outer peripheral portion of the luminescence receiving plate member 21 is engaged with the base portion 28a to be adhered to the same, and the side portions of the luminescence receiving plate member 21 are surrounded by the side wall portion 28b. The first and second index fluorescence detectors 22 and 23 both attached to the luminescence receiving plate member 21 are placed in the openings 28x and 28y of the metallic reflecting plate member 28 and in the openings 25x and 25y of the frame member 25.

Further, the back board member 27 such as shown in FIG. 12 can be applied also to the holder 24 employed in the embodiment of FIG. 13.

In the embodiments employing the holder 24 for supporting the photodetecting portion 20, which includes the luminescence receiving plate member 21 and the first and second index fluorescence detectors 22 and 23, as described above, since the luminescence receiving plate member 21 is held to cause its side portions to face the metallic reflecting layer 26 or the metallic reflecting plate member 28, the second index fluorescence emitted in the luminescence receiving plate member 21 and directed to parts of the side portions of the luminescence receiving plate member 21 other than the parts in the first and second cut-out side portions 21x and 21y to which the first and second index fluorescence detectors 22 and 23 are attached, respectively, is surely reflected at the side portions of the luminescence receiving plate member 21 toward the inside of the same, and then guided efficiently to the first and second index fluorescence detectors 22 and 23 to be detected thereby.

Further, the luminescence receiving plate member 21 is easily mounted to the screen panel portion 12 of the color cathode ray tube 10 so as to be disposed precisely at a proper position relative to the phosphor screen 14, and the surface of the luminescence receiving plate member 21 facing to the outer surface of the screen panel portion 12 is sealed up and prevented from being smeared with dust or dirt, so that the index fluorescence from the phosphor screen 14 is efficiently received by the luminescence receiving plate member 21.

I claim as my invention:

1. A beam-index type color cathode ray tube device comprising,
    a color cathode ray tube having a front panel portion lying on a plane generally parallel to said neck permitting colored light to pass therethrough and a screen panel portion provided with a rectangular phosphor screen including a plurality of color phosphor stripes accompanied with index phosphor on its inner surface facing said front panel portion, means impinging an electron beam on said screen from said neck;
    a luminescence receiving plate member disposed to face an outer surface of said screen panel portion for receiving index fluorescence from the index phosphor and producing secondary index fluorescence in response to the index fluorescence received thereby, said luminescence receiving plate members having first and second angled side portions which are respectively positioned to be close to two corners of the phosphor screen so as to look toward a central part of said luminescence receiving plate member,
    first fluorescence detecting means for detecting the secondary index fluorescence produced by said luminescence receiving plate member, said first fluorescence detecting means being attached at said first angled side portion, and
    second fluorescence detecting means for detecting the secondary index fluorescence produced by said luminescence receiving plate member, said second fluorescence detecting means being attached at said second angled side portions.

2. A beam-index type color cathode ray tube device according to claim 1, wherein said luminescence receiving plate member is generally rectangular in shape and extends to cover the phosphor screen with the screen panel portion between.

3. A beam-index type color cathode ray tube device according to claim 1, wherein said luminescence receiving plate member is formed of plastic containing phosphors dispersed therein, said phosphors being excited by the index fluorescence from the index phosphor in the phosphor screen to emit said secondary index fluorescence.

4. A beam-index type color cathode ray tube device according to claim 3, wherein said first and second fluorescence detecting means are attached at said first and second angled side portions respectively with transparent adhesive agent.

5. A beam-index type color cathode ray tube device according to claim 4, wherein said luminescence receiving plate member is provided with a metallic reflecting layer covering its side portions with the exception of parts of said first and second angled side portions to which said first and second fluorescence detecting means are attached, respectively.

6. A beam-index type color cathode ray tube device according to claim 1 further comprising a holder secured to the screen panel portion of said color cathode ray tube for supporting said luminescence receiving plate member.

7. A beam-index type color cathode ray tube device according to claim 6, wherein said holder comprises a frame member formed to have a base portion for contacting with an outer peripheral portion of said luminescence receiving plate member and a side wall portion for surrounding side portions of said luminescence receiving plate member contacting with said base portion at its outer peripheral portion, and a metallic reflecting layer provided on an inner surface of the side wall portion of said frame member.

8. A beam-index type color cathode ray tube device according to claim 7, wherein said side wall portion of said frame member is provided with a pair of openings in which said first and second fluorescence detecting means attached to said first and second angled side portions are placed, respectively.

9. A beam-index type color cathode ray tube device according to claim 8, wherein said holder further comprises a back board member secured to said frame member with which said luminescence receiving plate member is engaged, so as to support one surface of said luminescence receiving plate member opposite to the other surface of said luminescence receiving plate member facing to the screen panel portion.

10. A beam-index type color cathode ray tube device according to claim 6, wherein said holder comprises a frame member and a metallic reflecting plate member placed at the inside of said frame member for engaging with said luminescence receiving plate member.

11. A beam-index type color cathode ray tube device according to claim 10, wherein said metallic reflecting plate member has a base portion formed in the shape of a frame for contacting with an outer peripheral portion of said luminescence receiving plate member and a side wall portion for surrounding side portions of said luminescence receiving plate member contacting with said base portion at its outer peripheral portion.

12. A beam-index type color cathode ray tube device according to claim 11, wherein said side wall portion of said metallic reflecting plate member is provided with openings in which said first and second fluorescence detecting means attached to said first and second angled side portions are placed, respectively.

13. A beam-index type color cathode ray tube device according to claim 12, wherein said holder further comprises a back board member secured to said frame member, in which said metallic reflecting plate member is placed together with said luminescence receiving plate member, so as to support one surface of said luminescence receiving plate member opposite to the other surface of said luminescence receiving plate member facing to the screen panel portion.

* * * * *